United States Patent
Santhanam (10) Patent No.: US 8,103,295 B2
(45) Date of Patent: Jan. 24, 2012

(54) OPTIMISTIC ACCESS PROCEDURE AT DORMANT TARGET HANDSET IN A CDMA2000 1X NETWORK WITH F-QPCH ENABLED

(75) Inventor: Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 915 days.

(21) Appl. No.: 11/609,524

(22) Filed: Dec. 12, 2006

(65) Prior Publication Data

US 2008/0137588 A1 Jun. 12, 2008

(51) Int. Cl.
*H04W 68/00* (2009.01)
*H04B 17/00* (2006.01)
*H04B 1/18* (2006.01)
*H04B 7/00* (2006.01)
*H04W 4/00* (2009.01)

(52) U.S. Cl. ............... 455/458; 455/67.1; 455/161.1; 455/426.1; 455/434; 455/515

(58) Field of Classification Search .......... 370/320; 455/67.1, 161.1, 426.1, 434, 458, 515
See application file for complete search history.

(56) References Cited

U.S. PATENT DOCUMENTS

| | | | |
|---|---|---|---|
| 6,650,912 B2 | 11/2003 | Chen et al. | |
| 6,711,413 B1 * | 3/2004 | Heidari | 455/515 |
| 6,912,244 B2 | 6/2005 | Challa et al. | |
| 2001/0044313 A1 * | 11/2001 | Abrishamkar | 455/458 |
| 2003/0008691 A1 * | 1/2003 | Chen et al. | 455/574 |
| 2003/0143951 A1 * | 7/2003 | Challa et al. | 455/20 |
| 2005/0277429 A1 | 12/2005 | Laroia et al. | |
| 2006/0176870 A1 * | 8/2006 | Joshi et al. | 370/345 |
| 2008/0137588 A1 * | 6/2008 | Santhanam | 370/320 |

FOREIGN PATENT DOCUMENTS

WO 0035107 6/2000

OTHER PUBLICATIONS

International Search Report—PCT/US07/087295, International Search Authority—European Patent Office—Rijswijk-Jun. 18, 2008.
Written Opinion—PCT/US07/087295, International Search Authority—European Patent Office—Berlin-Jun. 18, 2008.
International Preliminary Report on Patentability—PCT/US07/087295, International Search Authority—European Patent Office—Berlin-Mar. 19, 2009.
Taiwan Search Report—TW096147564—TIPO—May, 5, 2011.

* cited by examiner

*Primary Examiner* — Nick Corsaro
*Assistant Examiner* — Munsoon Choo
(74) *Attorney, Agent, or Firm* — Raphael Freiwirth (57) ABSTRACT

A system and method for reducing communication latency including monitoring a communication channel for a plurality of indicators wherein a first indicator represents a desired communication operation; basing a communication operation upon a second indicator that indicates that the communication operation has an optimistic probability of success; and initiating an operation optimistically when at least the second indicator confirms that the operation optimistically initiated was a correct operation based upon the second indicator confirming the desired communication operation represented by the first indicator.

38 Claims, 5 Drawing Sheets

OPTIMISTIC ACCESS PROCEDURE AT DORMANT TARGET HANDSET IN A CDMA2000 1X NETWORK WITH F-QPCH ENABLED

BACKGROUND OF THE INVENTION

1. Field

The present invention generally relates towards reducing communication latency in communication systems. More particularly, the present invention relates to an optimistic access procedure for communication with a dormant target handset.

2. Background

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xRTT, "1x", and 1xEV-DO standards, "1XEV", for example) or TD-SCDMA.

In wireless communication systems, mobile stations or access terminals receive signals from fixed position base stations (also referred to as cell sites or cells) that support communication links or service within particular geographic regions adjacent to or surrounding the base stations. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Typically, each mobile station monitors a control channel that can be used to exchange messages between the mobile station and the base station. The control channel is used to transmit system/overhead messages, whereas traffic channels are typically used for substantive communication (e.g., voice and data) to and from the mobile station.

For example, the control channel can be used to establish traffic channels, control power levels, and the like and is known in the art. Generally, there are two types of power control for the reverse link, open-loop and closed-loop power control. The open-loop power control typically occurs prior to the mobile terminal establishing contact with a base station. The closed-loop control occurs after the mobile and the base station are in communication and the base station can measure the received power levels and feedback power level adjustments to the mobile terminal.

In the open loop condition, the reverse link power for an initial communication signal (e.g., access probe) from the mobile terminal to the base station can be determined by monitoring specialized signals from a base station or access point. For example, in CDMA systems, a pilot signal can be used to estimate the channel condition and then determine a power estimate for transmitting back to the base station. The accuracy of the channel conditions and power estimation can greatly impact performance of the system, particularly in terms of latency of the system. For example, 1x and 1xEV systems will transmit an access probe at a first power level based on a power control algorithm. If the first access attempt does not succeed, then the probe is resent at increasingly higher power levels, until it is successful or the power level maximum is reached.

In addition to the message loss due to power related issues (e.g., channel fading, time-varying RoT, etc.), Access Channel losses can also occur because of access probe collisions may be the case in geographically dense group calls. Losses that are caused due to the fading of the wireless channel can be minimized by increasing the transmit power of access probes. Losses due to probe collisions over the Access channel can be mitigated by ensuring that probe transmissions that are synchronized with respect to each other do not transmit their probes at the same time.

Additionally, advances in technology have resulted in smaller and more powerful personal computing devices. For example, there currently exist a variety of portable personal computing devices, including wireless computing devices, such as portable wireless telephones, laptops, personal digital assistants (PDAs) and paging devices that are each small, lightweight, and can be easily carried by users. A wireless device is any device that can communicate with other devices without being physically attached to them. Most wireless devices communicate with each other through radio frequencies.

More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

However, these smaller and more powerful personal computing devices are typically severely resource constrained. For example, the screen size, amount of available memory and file system space, amount of input and output capabilities and processing capability may each be limited by the small size of the device. Due to severe resource constraints, it is often typically desirable, for example, to maintain a limited size and quantity of software applications and other information residing on such remote personal computing devices (client devices).

Some of the personal computing devices utilize an application programming interface (API) or application programming interfaces (APIs), sometimes referred to as runtime environments and software platforms, that are installed onto their local computer platform and which are used, for example, to simplify operations of such devices, such as by providing generalized calls for device specific resources. An API is a set of routines used by an application program to direct the performance of procedures used by the computer's operating system.

Further, some APIs are also known to provide software developers the ability to create software applications that are fully executable on such devices. In addition, some of such APIs are known to be operationally located between the computing device system software and the software applications such that the computing device system software and the software applications such that the computing device computing functionality is made available to the software application without requiring the software developer to have the specific computing device system source code. Further, some APIs are known to provide mechanisms for secure communications between such personal devices (i.e., clients) and remote devices (i.e., servers) using secure, cryptographic information.

Examples of such APIs, some of which are discussed in more detail below, include versions of the Binary Runtime Environment for Wireless® (BREW®) developed by QUALCOMM, Inc., of San Diego, Calif. BREW® can operate with a computing device's (e.g., a wireless cellular phone) operating system, and can, among other features, provide interfaces to hardware features particularly found on personal computing devices. BREW® can also provide these interfaces on such personal computing devices at a relatively low cost with respect to demands on device resources and with respect to the price paid by consumers for devices containing the BREW® API. Additional features of BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security, and application distribution functionality, and the client performs, for example, application execution, security and user interface functionality.

The foregoing description of the related art is merely intended to provide an overview of wireless devices and some of the known uses of APIs and as an introduction to the BREW® platform, which can be used in various embodiments of the invention. However, the invention is not to be construed as being limited to a specific physical configuration, implementation, operating platform or environment.

By initiating a communication operation at the target handset optimistically, there is a reduction in delay without any major increase in power consumption. Optimistically refers to carrying out an operation, based on a belief or understanding (based on data, past observations, empirical evidence etc.) that there is a good chance or expectation outcome that the operation will be carried out successfully.

SUMMARY OF THE INVENTION

Exemplary embodiments of the present invention are directed towards a system and method for using a mobile device earphone or microphone connector as an input device interface.

Accordingly, one embodiment of the invention can be a method for reducing communication latency including: monitoring a communication channel for a plurality of indicators wherein a first indicator represents a desired communication operation; basing a communication operation upon a second indicator that indicates that the communication operation has an optimistic probability of success; and initiating an operation optimistically when at least the second indicator confirms that the operation optimistically initiated was a correct operation based upon the second indicator confirming the desired communication operation represented by the first indicator.

An apparatus for reducing communication latency including: logic configured to monitor a communication channel for a plurality of indicators wherein a first indicator represents a desired communication operation; logic configured to base a communication operation upon a second indicator that indicates that the communication operation has an optimistic probability of success; and logic configured to initiate an operation optimistically when at least the second indicator confirms that the operation optimistically initiated was a correct operation based upon the second indicator confirming the desired communication operation represented by the first indicator.

Another embodiment of the invention can include a system for reducing communication latency including: means for monitoring a communication channel for a plurality of indicators wherein a first indicator represents a desired communication operation; means for basing a communication operation upon a second indicator that indicates that the communication operation has an optimistic probability of success; and means for initiating an operation optimistically when at least the second indicator confirms that the operation optimistically initiated was a correct operation based upon the second indicator confirming the desired communication operation represented by the first indicator.

A computer-readable medium on which is stored a computer program comprising instructions which, upon being executed, causes the computing device to perform a process of: monitoring a communication channel for a plurality of indicators wherein a first indicator represents a desired communication operation; basing a communication operation upon a second indicator that indicates that the communication operation has an optimistic probability of success; and initiating an operation optimistically when at least the second indicator confirms that the operation optimistically initiated was a correct operation based upon the second indicator confirming the desired communication operation represented by the first indicator.

BRIEF DESCRIPTION OF THE DRAWINGS

A more complete appreciation of embodiments of the invention and many of the attendant advantages thereof will be readily obtained as the same becomes better understood by the reference to the following detailed description when considered in connection with the accompanying drawings which are presented solely for illustration and not limitation of the invention, and in which.

DETAILED DESCRIPTION OF THE INVENTION

Various embodiments of the invention are disclosed in the following description and related drawings directed to specific embodiments of the invention. Alternate embodiments may be devised without departing from the spirit and scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One or more embodiments of the invention can be used in conjunction with a runtime environment (e.g., API) executing on a computing device. One such runtime environment (API) is the Binary Runtime Environment for Wireless® (BREW®) software previously discussed. However, one or more embodiments of the invention can be used with other types of runtime environments (APIs) that, for example, operate to control the execution of applications on wireless client computing devices.

Figure 1:
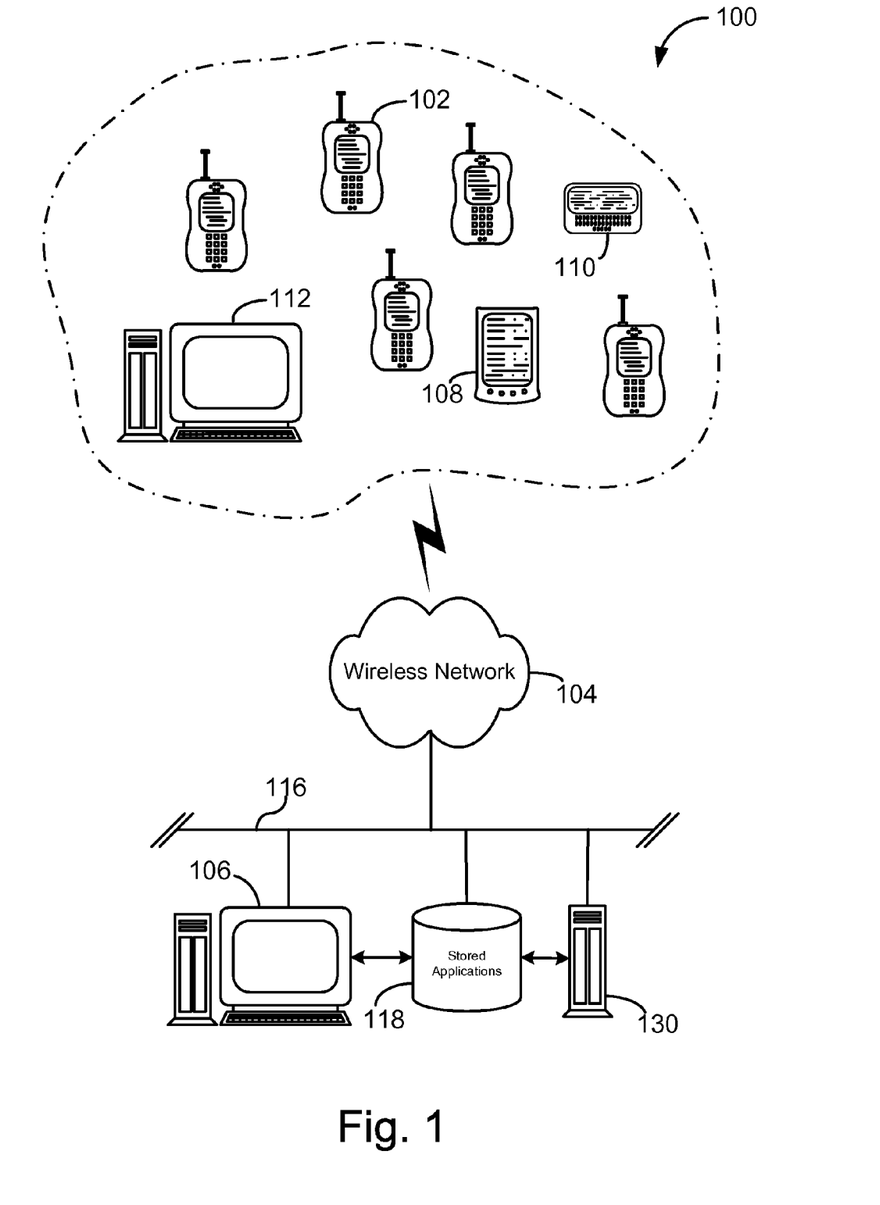
FIG. 1 is an exemplary diagram of a wireless network architecture that supports client devices and servers in accordance with at least one embodiment of the invention.

FIG. 1 illustrates a block diagram of one exemplary embodiment of a wireless system 100 in accordance with at least one embodiment of the invention. System 100 contains client devices, such as cellular telephone 102, in communication across a wireless network 104 with at least one application download server (ADS) 106 that selectively transmits software applications and components to wireless devices across a wireless communication portal or other data access to the wireless network 104. As shown in FIG. 1, the wireless (client) device can be a cellular telephone 102, a personal digital assistant 108, a pager 110, which is shown here as a two-way text pager, or even a separate computer platform 112 that has a wireless communication portal. This separate computer platform 112 may be fixed (e.g. desktop) or mobile (e.g. laptop).

The various embodiments of the invention can thus be realized on any form of client device or wireless devices including a wireless communication portal of having wireless communication capabilities, including without limitation, wireless modems, PCMCIA cards, personal computers, access terminals, telephones, or any combination or sub-combination thereof.

The application download server (ADS) 106 is shown here on a network 116 with other computer elements in communication with the wireless network 104. There can be a stand-alone server 122, and each server can provide separate services and processes to the client devices 102, 108, 110 and 112 across the wireless network 104. There is preferably also at least one stored application database 118 that holds the software applications that are downloadable by the wireless devices 102, 108, 110 and 112. However, those skilled in the art will appreciate that the configuration illustrated in FIG. 1 is merely exemplary. Accordingly, embodiments of the invention can include one or more servers that can each perform all the described functions and contain all necessary hardware and software, or can contain only selected functionality. Further, not all elements (e.g., pager 110, ADS 106, database 118, etc.) illustrated are necessarily used in all of the different embodiments of the invention that may be implemented.

Figure 2:
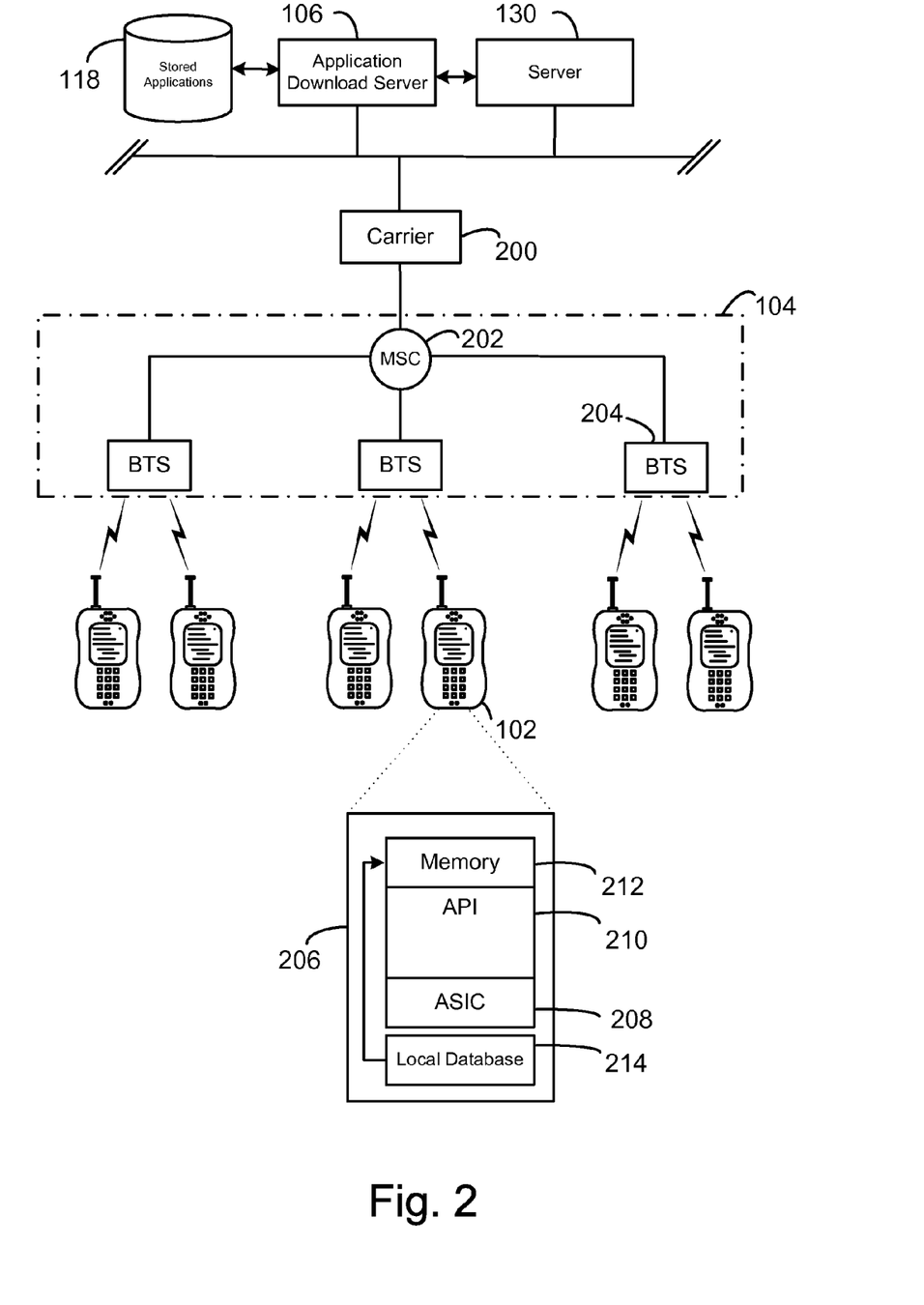
FIG. 2 is a more detailed exemplary diagram of a wireless network architecture that supports the client devices and servers in accordance with at least one embodiment of the invention.

In FIG. 2, a block diagram is shown that more fully illustrates system 100, including the components of the wireless network 104 and the interrelation of the elements of the exemplary embodiments of the invention. System 100 is merely exemplary and can include any system that allows remote client devices, such as wireless client computing devices 102, 108, 110 and 112 to communicate over-the-air between and among each other and/or between and among components connected via a wireless network 104, including, without limitation, wireless network carriers and/or servers. The application download server 106 and the stored application database 118, along with any other servers such as ad display server 130 which are used to provide cellular telecommunications services, communicate with a carrier network, through a data link, such as the Internet, a secure LAN, WAN, or other network. In the embodiment shown, a server 120 can include the application download server 106, ad dispatch server 130 and the stored application database 118. The application download server 106, server 130 and the stored application database 118 are illustrated as independent devices in this embodiment. However, these devices can also be integrated into one common server or the functionality of one or more may be distributed over multiple devices, as will be appreciated by those skilled in the art.

The carrier network 200 controls messages (typically sent as data packets) sent to a messaging service controller (MSC) 202. The carrier network 200 communicates with the MSC 202 by a network, the Internet and/or a public switched telephone network (PSTN). Typically, the network or Internet connection between the carrier network 200 and the MSC 202 transfers data, and the PSTN transfers voice information. The MSC 202 can be connected to multiple base stations (BTS) 204. In a similar manner to the carrier network, the MSC 202 is typically connected to the BTS 204 by a network, the Internet and/or PSTN for data transfer and/or voice information. The BTS 204 can broadcast data messages wirelessly to the client devices, such as cellular telephone 102, by short messaging service (SMS), UDP datagrams, data over signaling (DOS), or other over-the-air (OTA) methods known in the art.

The client device, (here a wireless client computing device), such as a cellular telephone 102, has a computer platform 206 that can receive and execute software applications and/or commands transmitted form the application download server 106, ad dispatch server 130 and/or server 120. The computer platform 206 can include an application specific integrated circuit (ASIC) 208, or other processor, microprocessor, logic circuit, or other data processing device. The ASIC 208 or other processor executes the API 210 layer that interfaces with any resident programs in the memory 212 of the wireless device. The memory 212 can be comprised of read-only or random-access memory (RAM and ROM), EEPROM, flash cards, or any memory common to computer platforms. The computer platform 206 also includes a local database 214 that can hold applications not actively used in memory 212. The local database 214 is typically a flash memory cell, but can be any secondary storage device as know to those skilled in the art, such as magnetic media, EPROM, optical media, tape, soft or hard disk, or the like.

The wireless client computing device, such as cellular telephone 102, has installed on it, or otherwise downloads, one or more software applications, such as games, news, stock monitors, and the like. For example, the cellular telephone 102 may receive one or more software applications downloaded from the application download server 106. The software applications may be stored on the local database 214 when not in use. The cellular telephone 102 or other wireless computing device may upload resident applications stored on the local database 214 to memory 212 for execution on the API 210 when so desired by the user or invoked by another API.

As used herein "client device", "wireless device" or "client computing device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to ads communicated between a client device and a server. The client computing device can be serviced by at least one remote server with respect to at least such ads. Some examples of "wireless computing devices" which may be used in accordance with various embodiments of the present invention includes cellular telephones or other wireless communication units, PDAs, laptops, paging devices, navigation devices (e.g., GPS-based systems), handheld gaming devices, music or video content download units, and other like wireless communication devices.

The wireless communication between the client device 102 and the BTS 204 can be based on different technologies, such as code division multiple access (CDMA), time division multiple access (TDMA), frequency division multiple access (FDMA), the global system for mobile communications (GSM), or other protocols that may be used in a wireless communications network or a data communications network. The data communication is typically between the client device 102, BTS 204, and MSC 202. The MSC 202 can be connected to multiple data networks such as the carrier network 200, PSTN, the Internet, a virtual private network, and the like, thus allowing the client device access to a broader communication network. As discussed in the foregoing, in addition to voice transmission, data can be transmitted to the client device via SMS (short messaging service) or other OTA (over-the-air) methods known in the art.

In one scenario, a CDMA2000 1X system with F-QPCH (Forward Link Quick Paging Channel) support is enabled. The target handset is in a dormant state and has just been notified via the F-QPCH (Forward Link Quick Paging Channel) paging indicator bit that it has a page queued at the BTS. The target handset, upon decoding both its paging indicator bits as '1' will wait until the F-CCCH (Forward Communication Control Channel) slot boundary that starts 20 msec following the end of the F-QPCH slot, for a General Page Message (GPM) from the BTS.

After reception of the page message, the target handset will process the GPM in the update overhead sub-state. The target handset is required to respond to this page message, but must perform a jump-to-hyperspace operation. In one example, this procedure can take anywhere from 106.67~186.67 milliseconds to complete.

Those skilled in the art will appreciate that the completion time will vary depending upon the specific communication system implementation and its associated operational and performance characteristics.

The term jump-to-hyperspace refers to an access probe pre-transmit delay. This delay is implementation specific (i.e., not required by the CDMA2000 standard).

As an example, a Reverse Link Jump-to-Hyperspace is the process of synchronizing a mobile's Reverse Link (Tx) timing to the Forward Link (Rx) CDMA system timing and performing acquisition procedures in a CDMA system. The delay due to the RL Jump-to-Hyperspace is incurred during every access attempt, and ranges from 106.7 ms~186.7ms. The delay is broken into three wait states:

PHASE_2_WAIT_1: Wait for the beginning of the third PN roll of a superframe to turn on the Tx clock. This state is executed based on Forward Link timing. This step is necessary to ensure that the clock is on when the demodulator reaches the 80 ms sync point. At that time, the modulator clock is synchronized with the demodulator clock. This state requires 0 ms~80 ms.

PHASE_2_WAIT_2: Wait for the beginning of the third PN roll of the Rx superframe to load the long and short codes. These take effect on the next 80 ms modulator frame boundary. Notice that this boundary is only valid because of the PHASE_2_WAIT_1 state. If we had skipped the first state, then the long code would be loaded at a wrong time. This state requires exactly 80 ms.

PHASE_0_WAIT: Wait for the beginning of the first PN roll of the Rx superframe to ensure that the long/short codes are in effect. Install the REACH ISR to begin transmitting a thenext slot boundary. This state requires exactly 26.66 ms.

Possible optimizations of the Reverse Link Jump-to-Hyperspace are:

Leave the Tx clock on all the time, and jump every time there is an idle handoff.

Leave the Tx clock on for 2 seconds after the jump to hyperspace. This would remove the entire 106.7~186.7 ms interval for subsequent access attempts.

Start the jump to hyperspace in parallel with other processing (such as update overhead).

Upon completion of the jump-to-hyperspace operation, the target handset transmits its Page Response or an ACK-order message over the Access channel. The above sequence of operations are fundamental to the operation of CDMA2000 1x-A, and may apply uniformly to all applications including both push-to-talk (PTT) and non-push-to-talk applications. As a result of this serial approach in performing the operations described above in CDMA2000 1x (using F-QPCH), a significant amount of additional latency (e.g. between 80~160 milliseconds) is experienced by all applications.

Latency is improved by initiating the jump-to-hyperspace operation at the target handset optimistically as soon as the $1^{st}$ paging indicator bit is decoded as a '1' over the F-QPCH channel. Assuming transmissions over the F-QPCH channel have a low probability of decoding error, there is a high likelihood of decoding a '1' correctly in the first half of the F-QPCH slot. It may not be necessary to wait and decode the $2^{nd}$ F-QPCH paging indicator if the first bit is decoded as a '1'. The process of listening to or searching for both bits as opposed to just one bit lowers the probability of decoding error significantly. However, this may not be necessary if the reliability of the F-QPCH is adequately high (e.g. BER~1%).

During operation, it is possible that an optimistic jump-to-hyperspace operation that is triggered upon decoding only the $1^{st}$ paging bit can result in this operation being invoked more often than necessary. This will happen whenever the $2^{nd}$ paging bit is decoded as a '0' while the $1^{st}$ paging bit was decoded as a '1'. Assuming that the BER on the F-QPCH is 1%, unnecessary jump-to-hyperspaces will be invoked at a rate of 1%, a sufficiently small value. It may even be possible to abort a jump-to-hyperspace operation in progress after decoding the $2^{nd}$ paging indicator bit as '0' so that the mobile can conserve energy by going into a sleep or dormant mode.

In the exemplary situation where it is only possible to initiate the jump-to-hyperspace operation upon decoding the $2^{nd}$ paging bit, performance is enhanced if the two paging indicator bits for communication devices were hashed into other frames (e.g. the $1^{st}$ and the $3^{rd}$ frames of the F-QPCH slot) so that communication devices can listen to both paging indicator bits early-on and still have enough time to get ready for an early initiation of the jump-to-hyperspace procedure.

Figure 3:
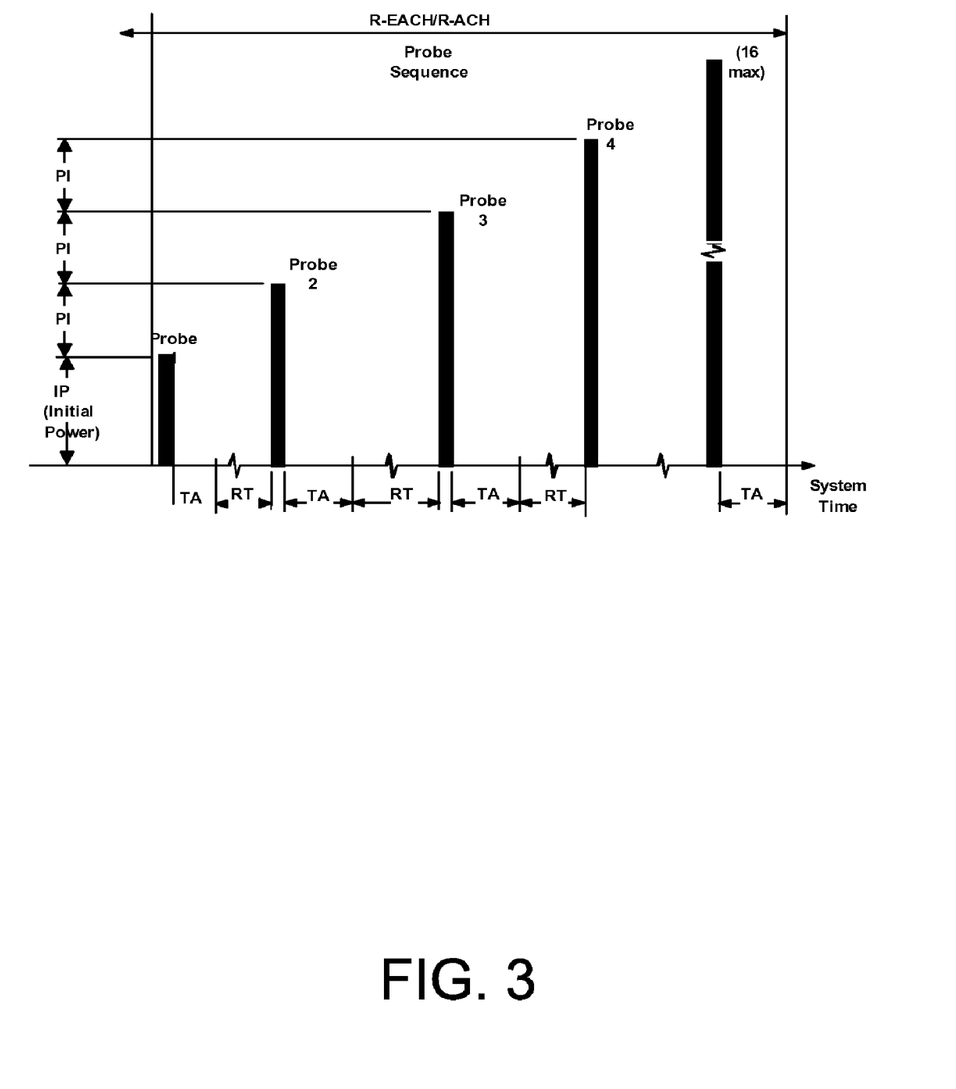
FIG. 3 is an exemplary diagram illustrating access probe transmissions over the Access Channel (R-EACH)

FIG. 3 is an exemplary diagram illustrating access probe transmissions over the Access Channel in accordance with at least one embodiment of the invention. Additionally, the initial transmit power (e.g., IP or $P_{init}$) is determined based on the channel load in embodiments of the invention. Accordingly, embodiments of the invention can use both the initial random backoff and the enhanced transmit power determination to increase the probability of successful receipt of the access probe.

Figure 4:
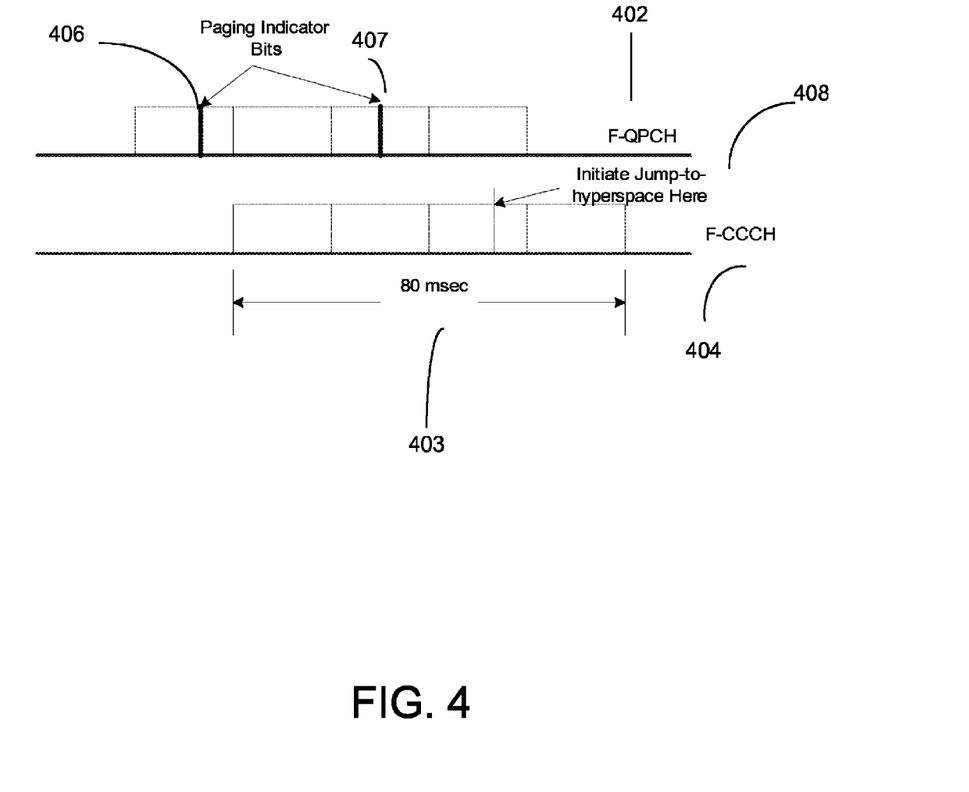
FIG. 4 is an exemplary diagram illustrating an optimistic jump-to-hyperspace operation.

An exemplary optimistic jump-to-hyperspace initiation scenario is shown in FIG. 4. The jump-to-hyperspace operation begins 26.67 milliseconds prior to the start of the 80 millisecond (403) F-CCCH slot (404). Since the start of the F-QPCH slot (402) precedes an overlapping F-CCCH (404) slot by 20 milliseconds, there is at least a time interval of 40+20−26.67=33.33 milliseconds between decoding the $1^{st}$ paging indicator bit (406) as a '1' on the F-QPCH channel and before beginning the jump-to-hyperspace operation. It is expected that this interval would be sufficient for any processing delays (e.g. processing delays attributed to software and hardware) that are needed before the initiation of the jump-to-hyperspace operation.

In case both paging bits on the F-QPCH are decoded, and assuming that the $2^{nd}$ paging indicator bit (407) lies in the $3^{rd}$ frame of the F-QPCH slot, the minimum amount of time from the end of the $3^{rd}$ F-QPCH frame to the start of the jump-to-hyperspace procedure is about 13.33 msec. Those skilled in the art will appreciate that other bits, data frames, delay times etc. may be used without departing from the spirit and scope of the present invention.

An early initiation of jump-to-hyperspace requires certain types of functionality and capability at the handset. For example, the handset should be capable of decoding the paging indicator bits transmitted over the F-QPCH, decoding pages transmitted over the F-CCCH, performing update overhead processing upon receiving a page and possibly readying a Page Response message in parallel (to be transmitted over the R-EACH) while the jump-to-hyperspace procedure is ongoing. Typically, the update overhead processing is a software operation. It is therefore expected that this procedure can also be performed in tandem or in parallel with an ongoing jump-to-hyperspace operation.

The aforementioned approach described in the specification reduces delay. For example, in one embodiment, parallelizing the jump-to-hyperspace operation with reception of pages on F-CCCH + update overhead operation+readying the access probe for transmission over R-EACH can lead to savings in delay between 80~160 milliseconds. This delay saving applies uniformly to all applications that use the Access channel.

Figure 5:
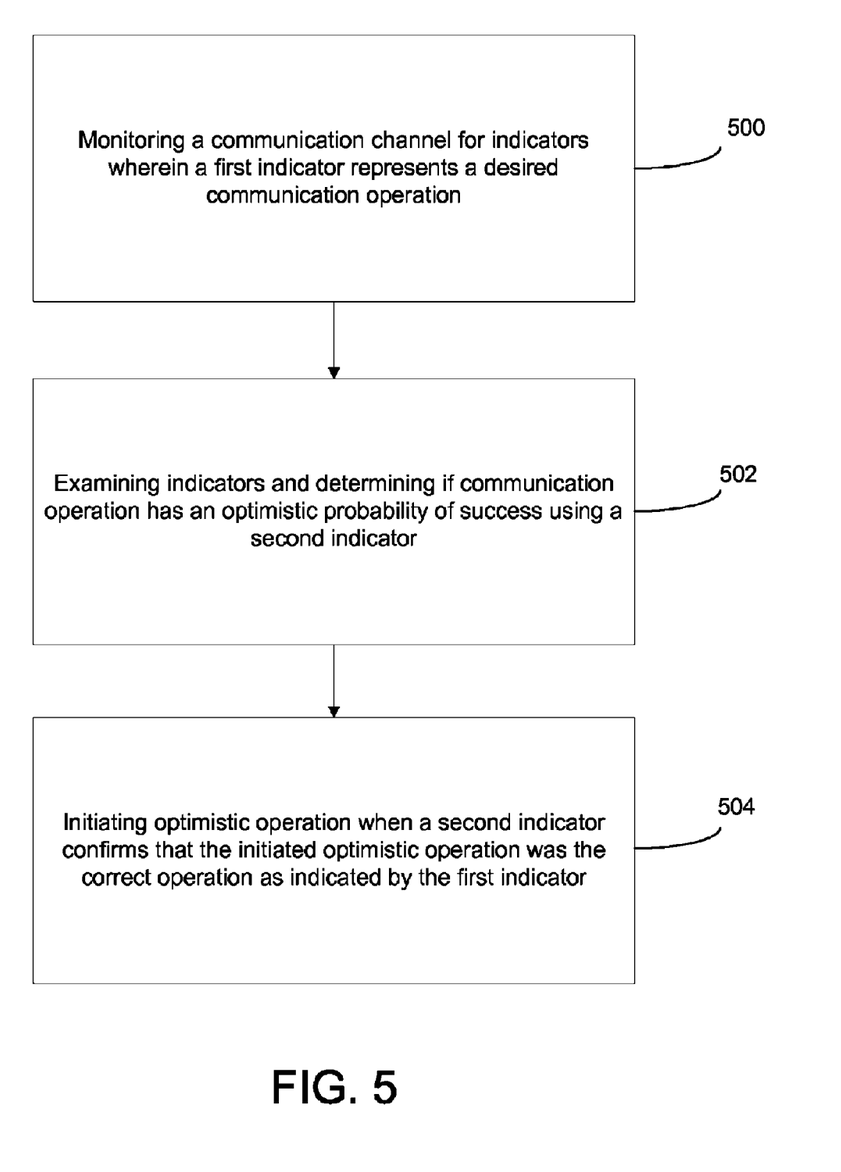
FIG. 5 is an exemplary diagram illustrating a method in accordance with at least one embodiment of the invention.

FIG. 5 illustrates another embodiment of the present invention. In FIG. 5, a communication channel is monitored for a plurality of indicators wherein a first indicator represents a desired communication operation (500). A communication operation is based upon a second indicator that indicates that the communication operation has an optimistic probability of success (502). An operation is initiated optimistically when at least the second indicator confirms that the operation optimistically initiated was a correct operation based upon the second indicator confirming the desired communication operation represented by the first indicator (504).

Further, the arrangement of the logic elements is merely for the convenience of illustration and should not be construed as limiting embodiments of the invention. As will be appreciated by those skilled in the art, the functionality of the logic elements described herein may be integrated into one element or distributed as desired among various hardware and software elements.

Those skilled in the art will appreciate that there is no particular order of performing and executing the method functional blocks intended or implied in the preceding description. The foregoing methods discussed above can be used by themselves or in any combination thereof to achieve the same objective.

In further embodiments, those skilled in the art will appreciate that the foregoing methods can be implemented by the execution of a program embodied on a computer readable medium, such as the memory of a computer platform. The instructions can reside in various types of signal-bearing or data storage primary, secondary or tertiary media. The media may comprise, for example, RAM accessible by, or residing within, the client device and/or server. Whether contained in RAM, a diskette, or other secondary storage media, the instructions may be stored on a variety of machine-readable data storage media, such as direct access storage device (DASD) storage (e.g., a conventional "hard drive" or a RAID array), magnetic tape, electronic read-only media (e.g., ROM, or EEPROM), flash memory cards, an optical storage device (e.g. CD-ROM, WORM, DVD, digital optical tape), paper "punch" cards, or other suitable data storage media including digital and analog transmission media.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

While the foregoing disclosure shows illustrative embodiments of the invention, it should be noted that various changes and modifications could be made herein without departing from the scope of the invention as defined by the appended claims. The activities or steps of the method claims in accordance with the embodiments of the invention described herein need not be performed in any particular order. Furthermore, although elements of the invention may be described in the singular, the plural is contemplated unless the limitation to the singular is explicitly stated.

The invention claimed is:
1. A method for reducing communication latency, comprising:
receiving, via a communication channel, a first paging indicator bit, wherein the first indicator bit represents an indication relating to a jump-to-hyperspace operation;

determining, based on decoding the first paging indicator bit, that the jump-to-hyperspace operation has an optimistic probability of success;

initiating the jump-to-hyperspace operation optimistically before decoding a second paging indicator bit, wherein the second paging indicator bit is for confirming the first paging indicator bit, wherein the initiating of the jump-to-hyperspace operation optimistically is in response to the determining, based on the decoding of the first paging indicator bit, that the jump-to-hyperspace operation has the optimistic probability of success;

receiving the second paging indicator bit; and determining whether the jump-to-hyperspace operation was a correct operation based upon decoding the second paging indicator bit.

2. The method of claim 1, further comprising:
decoding the first paging indicator bit.

3. The method of claim 2, wherein the optimistic probability of success occurs when the first paging indicator bit is decoded as a one (1).

4. The method of claim 2, wherein the communication channel is a Forward Link Quick Paging Channel (F-QPCH) channel.

5. The method of claim 2, wherein the first paging indicator bit and the second paging indicator bit are hashed into a first frame and a second frame of the communication channel.

6. The method of claim 5, wherein the first frame is a first frame of a Forward Link Quick Paging Channel (F-QPCH) slot and the second frame is a third frame of the F-QPCH slot.

7. The method of claim 1, further comprising aborting the jump-to-hyperspace operation when the determining whether the jump-to-hyperspace operation was the correct operation indicates an incorrect operation.

8. The method of claim 1, further comprising performing at least one additional operation substantially concurrently with performing the jump-to-hyperspace operation, wherein the at least one additional operation comprises at least one of decoding an additional paging indicator bit received via a Forward Link Quick Paging Channel (F-QPCH), decoding a page received via a Forward Communication Control Channel (F-CCCH), performing an update overhead operation, readying an access probe for transmission, or readying a page response message.

9. The method of claim 1, further comprising performing at least two operations in parallel with performing the jump-to-hyperspace operation, wherein the at least two operations include at least two of performing update overhead operations, or readying an access probe for transmission, or receiving a page on a Forward Communication Control Channel (F-CCCH).

10. The method of claim 1, further comprising reducing a pre-transmit delay associated with sending an access probe based on the initiating of the jump-to-hyperspace operation optimistically before decoding the second paging indicator.

11. The method of claim 1, wherein the initiating of the jump-to-hyperspace operation further comprises at least one of synchronizing a system timing or performing an acquisition procedure, in preparation for transmitting an access probe.

12. The method of claim 1, further comprising leaving on a transmit clock for a time period after the jump-to-hyperspace operation.

13. An apparatus for reducing communication latency comprising:

logic configured to receive, via a communication channel, a first paging indicator bit, wherein the first indicator bit represents an indication relating to a jump-to-hyperspace operation;

logic configured to determine, based on decoding the first paging indicator bit, that the jump-to-hyperspace operation has an optimistic probability of success;

logic configured to initiate the jump-to-hyperspace operation optimistically before decoding a second paging indicator bit, wherein the second paging indicator bit is for confirming the first paging indicator bit, wherein the initiating of the jump-to-hyperspace operation optimistically is in response to the determining, based on the decoding of the first paging indicator bit, that the jump-to-hyperspace operation has the optimistic probability of success;

logic, comprising hardware, configured to receive the second paging indicator bit; and logic configured to confirm whether the jump-to-hyperspace operation was a correct operation based upon decoding the second paging indicator bit.

14. The apparatus of claim 13, further comprising:
logic configured to decode the first paging indicator bit.

15. The apparatus of claim 14, wherein the optimistic probability of success occurs when the first paging indicator bit is decoded as a one (1).

16. The apparatus of claim 14, wherein the communication channel is a Forward Link Quick Paging Channel (F-QPCH) channel.

17. The apparatus of claim 14, wherein the first paging indicator bit and the second paging indicator bit are hashed into a first frame and a second frame of the communication channel.

18. The apparatus of claim 17, wherein the first frame is a first frame of a Forward Link Quick Paging Channel (F-QPCH) slot and the second frame is a third frame of the F-QPCH slot.

19. The apparatus of claim 13, further comprising logic configured to abort the jump-to-hyperspace operation when the logic to determine whether the jump-to-hyperspace operation was the correct operation indicates an incorrect operation.

20. The apparatus of claim 13, further comprising logic configured to perform at least one additional operation substantially concurrently with performing the jump-to-hyperspace operation, wherein the at least one additional operation comprises at least one of decoding an additional paging indicator bit received via a Forward Link Quick Paging Channel (F-QPCH), decoding a page received via a Forward Communication Control Channel (F-CCCH), performing an update overhead operation, readying an access probe for transmission, or readying a page response message.

21. The apparatus of claim 13, further comprising logic configured to perform at least two operations in parallel with performing the jump-to-hyperspace operation, wherein the at least two operations include at least two of performing an update overhead operation, or readying an access probe for transmission, or receiving a page on a Forward Communication Control Channel (F-CCCH).

22. The apparatus of claim 13, further comprising logic configured to reduce a pre-transmit delay associated with sending an access probe based on the initiating of the jump-to-hyperspace operation optimistically before decoding the second paging indicator.

23. The apparatus of claim 13, wherein the logic configured to initiate the jump-to-hyperspace operation further comprises at least one of logic configured to synchronize a system timing or logic configured to perform an acquisition procedure, in preparation for transmitting an access probe.

24. The apparatus of claim 13, further comprising logic configured to leave on a transmit clock for a time period after the jump-to-hyperspace operation.

25. A system for reducing communication latency comprising:
   means for receiving, via a communication channel, a first paging indicator bit, wherein the first indicator bit represents an indication relating to a jump-to-hyperspace operation;
   means for determining, based on decoding the first paging indicator bit, that the jump-to-hyperspace operation has an optimistic probability of success;
   means for initiating the jump-to-hyperspace operation optimistically before decoding a second paging indicator bit, wherein the second paging indicator bit is for confirming the first paging indicator bit, wherein the initiating of the jump-to-hyperspace operation optimistically is in response to the determining, based on the decoding of the first paging indicator bit, that the jump-to-hyperspace operation has the optimistic probability of success;
   means for receiving the second paging indicator bit; and
   means for determining whether the jump-to-hyperspace operation was a correct operation based upon decoding the second paging indicator bit.

26. The system of claim 25, further comprising:
   means for decoding the first paging indicator bit.

27. The system of claim 26, wherein the optimistic probability of success occurs when the first paging indicator bit is decoded as a one (1).

28. The system of claim 26, wherein the communication channel is a Forward Link Quick Paging Channel (F-QPCH) channel.

29. The system of claim 26, wherein the first paging indicator bit and the second paging indicator bit are hashed into a first frame and a second frame of the communication channel.

30. The system of claim 29, wherein the first frame is a first frame of a Forward Link Quick Paging Channel (F-QPCH) slot and the second frame is a third frame of the F-QPCH slot.

31. A non-transitory computer-readable medium on which is stored a computer program comprising instructions which, upon being executed, causes the computing device to perform a process of:
   receiving, via a communication channel, a first paging indicator bit, wherein the first indicator bit represents an indication relating to a jump-to-hyperspace operation;
   determining, based on decoding the first paging indicator bit, that the jump-to-hyperspace operation has an optimistic probability of success;
   initiating the jump-to-hyperspace operation optimistically before decoding a second paging indicator bit, wherein the second paging indicator bit is for confirming the first paging indicator bit, wherein the initiating of the jump-to-hyperspace operation optimistically is in response to the determining, based on the decoding of the first paging indicator bit, that the jump-to-hyperspace operation has the optimistic probability of success;
   receiving the second paging indicator bit; and
   determining whether the jump-to-hyperspace operation was a correct operation based upon decoding the second paging indicator bit.

32. The non-transitory computer readable medium of claim 31, wherein the process further comprises:
   decoding the first paging indicator bit.

33. The non-transitory computer readable of claim 32, wherein the optimistic probability of success occurs when the first paging indicator bit is decoded as a one (1).

34. The non-transitory computer readable of claim 32, wherein the communication channel is a Forward Link Quick Paging Channel (F-QPCH) channel.

35. The non-transitory computer readable of claim 32, wherein the first paging indicator bit and the second paging indicator bit are hashed into a first frame and a second frame of the communication channel.

36. The non-transitory computer readable of claim 35, wherein the first frame is a first frame of a Forward Link Quick Paging Channel (F-QPCH) slot and the second frame is a third frame of the F-QPCH slot.

37. A method for reducing communication latency, comprising:
   monitoring a communication channel for a first paging indicator that represents a jump-to-hyperspace operation and a second paging indicator that is for confirming the first paging indicator;
   receiving and decoding the first paging indicator and determining that the first indicator represents the jump-to-hyperspace operation;
   determining that the jump-to-hyperspace operation has an optimistic probability of success based on the decoded first paging indicator bit;
   initiating the jump-to-hyperspace operation optimistically before decoding the second paging indicator, wherein the initiating of the jump-to-hyperspace operation optimistically is in response to the determining, based on the decoded first paging indicator bit, that the jump-to-hyperspace operation has the optimistic probability of success;
   receiving the second paging indicator; and
   decoding the second paging indicator and determining whether the jump-to-hyperspace operation was a correct operation based on the decoded second paging indicator.

38. The method according to claim 37, wherein the optimistic probability of success is approximately 0.99.

\* \* \* \* \*